United States Patent [19]

van den Wildenberg et al.

[11] Patent Number: 4,526,155

[45] Date of Patent: Jul. 2, 1985

[54] PRESSURE REGULATING SYSTEM

[75] Inventors: Adrianus M. M. van den Wildenberg, Geldrop; Andreas L. M. T. Smeets, Eindhoven, both of Netherlands

[73] Assignee: Vialle B.V., Eindhoven, Netherlands

[21] Appl. No.: 577,110

[22] Filed: Feb. 6, 1984

[30] Foreign Application Priority Data

Feb. 4, 1983 [NL] Netherlands ............... 8300438

[51] Int. Cl.³ .................................. F02M 21/02
[52] U.S. Cl. .............................. 123/525; 123/527; 48/184; 48/180 R
[58] Field of Search ......... 123/525, 526, 527, 577, 123/575, 27 GE; 48/184, 189.1, 180.1

[56] References Cited

U.S. PATENT DOCUMENTS

| 2,896,599 | 7/1959  | Ensign    | 123/525   |
| 2,962,366 | 11/1960 | Oosterdijk | 48/184   |
| 3,406,666 | 10/1968 | Steiger   | 123/27 GE |
| 3,540,419 | 11/1970 | Fox       | 123/27 GE |
| 4,352,677 | 10/1982 | Jones     | 48/189.1  |
| 4,425,897 | 1/1984  | Irvoas    | 48/180.1  |
| 4,449,509 | 5/1984  | Young     | 123/27 GE |

FOREIGN PATENT DOCUMENTS

| 2361358 | 6/1975  | Fed. Rep. of Germany. |         |
| 848603  | 11/1939 | France                | 123/526 |
| 146044  | 11/1981 | Japan                 | 123/527 |
| 6903380 | 9/1969  | Netherlands.          |         |
| 8101284 | 10/1982 | Netherlands.          |         |
| 2026090 | 1/1980  | United Kingdom.       |         |

Primary Examiner—E. Rollins Cross
Attorney, Agent, or Firm—Buell, Ziesenheim, Beck & Alstadt

[57] ABSTRACT

A pressure regulating system with amplifier is provided for preparing the mixture of a gas with air for a combustion engine. The pressure regulating system comprises a first and second inlet conduit opening in a first chamber through which gas is supplied under constant pressure. The first inlet conduit is separated from the first chamber by a valve connected to a diaphragm. The second inlet conduit comprises an adjustable restriction, through which a constant small quantity of gas being delivered to the first chamber. The pressure regulating system also comprises an outlet conduit being directly connected to the first chamber and to the inlet of the user and a second chamber being separated from the first chamber by said diaphragm. To said second chamber a third inlet conduit, provided with an adjustable restriction, is connected, through which a constant small quantity of gas is delivered to the second chamber. The second chamber is also connected to the first chamber i.e. outlet conduit, through a variable restriction.

23 Claims, 3 Drawing Figures

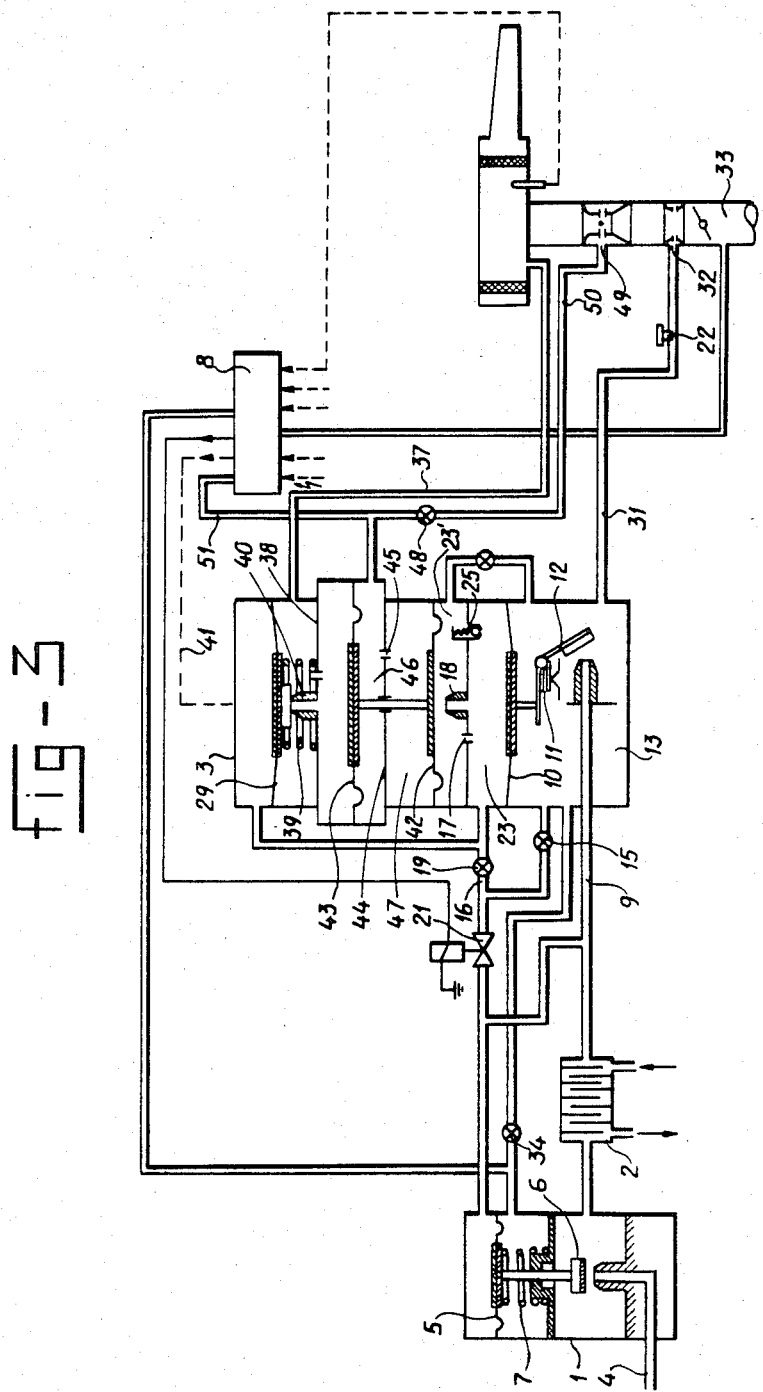

PRESSURE REGULATING SYSTEM

The invention relates to a pressure regulating system with amplifier, comprising a first and a second inlet conduit opening in a first chamber, through which gas is supplied under constant pressure, the first inlet conduit being separated from the first chamber by a valve connected with a diaphragm and the second inlet conduit comprising an adjustable restriction, through which a constant small quantity of gas is supplied to the first chamber, an outlet conduit directly connected to the first chamber and connected to the inlet of the user, and a second chamber being separated from the first chamber by the diaphragm.

Such a system is known from the Dutch Patent Application No. 79,00519. In said publication the problem that the force for further opening the valve of the inlet conduit does increase every time the demand of the user increases, and with it the underpressure in the outlet conduit, is solved by using an amplifier system with underpressure such as in a water jet pump. This system only operates between restricted limits, because the force for the servocontrol is determined by the maximum under-pressure obtained by the water jet pump-effect, which effect is determined by given dimensions of the different parts. Because of the limited possible pressure difference relatively large diaphragms have to be used. Because of the high demands made upon the different parts, the production costs of this system are considerable.

The invention aims to avoid these drawbacks.

To this end a system as mentioned above is characterized according to the invention in that to the second chamber a third inlet conduit, provided with an adjustable restriction, is connected, through which a constant small quantity of gas is supplied into the second chamber and in that the second chamber is connected to the first chamber (outlet conduit) through a variable restriction. By this an amplifying system operating with overpressure is obtained at which, because the range of the overpressure control is large as compared with the range of the underpressure used in the known systems, a smaller diaphragm can be sufficient. Furthermore the amplifying system functions throughout the operating range of the pressure regulator.

According to a preferred embodiment of the pressure regulating system the variable restriction is controlled by a fuel control member. Said variable restriction can for instance comprise an electrically operated stepping motor, but also comprises all members being operable with any medium and being adjustable in many positions or not. To the fuel control member different data related to combustion engines can be supplied, such as whether or not being in operation, the number of revolutions, the composition of the exhaust gas, the operating temperature, the loading, etc.

According to another preferred embodiment of the variable restriction comprises a nozzle cooperating with a second diaphragm, the side of the second diaphragm being faced away from the nozzle being affected by a reference pressure. Said reference pressure can be measured at different locations in the air inlet manifold of the combustion engine. If for instance this is realised downstream of the air filter, an automatic correction for the clogging of the air filter is provided, in such a way that the mixture at increasingly clogged filter will not increase its fuel content. With said system it is possible to place the gas supply conduit under the throttle valve of the engine and to connect said conduit at a supercharged engine downstream of the supercharging member. Only the pressure difference between the point of reference and the suction point of the gas at a venturi is of importance.

According to a further embodiment a fixed restriction is provided in parallel with the variable restriction. In this way a presetting as well as damping for the diaphragm nozzle system is provided.

According to a further preferred embodiment between the conduit providing the reference pressure and the second diaphragm on which the reference pressure acts, a damping device is placed. By this a more stable regulation of the gas supply is obtained. Preferably said damping device comprises a fixed restriction and a variable restriction switched in parallel therewith. By this the rate of damping can be adapted to the operation conditions. The variable restriction can for instance comprise a valve being operated by a third diaphragm, at which on the one side of the third diaphragm a spring force and the reference pressure are acting and on the other side of which the pressure of the second chamber acts. By the fixed restriction and by the spring force acting on the diaphragm a presetting of the damping is obtained, being dependent on the reference pressure and the pressure on the diaphragm. It is also possible to allow a spring pressure to act on the second diaphragm. By this an additional force is exerted upon the second diaphragm, through which the diaphragm will only be opened at higher or lower pressures in the second chamber and there will be a constant positive or negative pressure difference between the second chamber and so the outlet conduit and the damped reference pressure determined by the strength of the spring.

According to a further preferred embodiment in which the second diaphragm is not provided with a spring and the gas supply and the inlet delivery sensing conduit are separated, the second diaphragm comprises two rigidly connected diaphragm parts, in which the space between the parts is separated by a baffle provided with a restriction into a chamber facing towards the first diaphragm and a chamber facing towards the third diaphragm and at which the chamber facing towards the third diaphragm is connected to the fuel control member and is connected to the inlet delivery sensing conduit by an adjustable restriction. By this device the double function of the venturi member for supplying gas to the combustion engine as well as of measuring the velocity of the air is split up. By this it is possible to meet the conflicting requirements related to the diameter of the venturi member, which has to be large for the supply of air, large in order not to influence a possibly provided petrol carbureter and small for creating underpressure.

According to a further preferred embodiment of the device described above with a divided second diaphragm, the diaphragm operating the nozzle has a smaller effective surface area than the other diaphragm, belonging to the second diaphragm. By the difference in surface area between the diaphragms each pressure difference at both sides of the larger diaphragm relates in the state of equilibrium to a higher pressure difference to both sides of the smaller diaphragm. By this diaphragm system the pressure difference of the delivery sensing is so amplified and inverted.

In all systems described above between the first and second chamber an adjustable restriction can be provided, by which a further adjustment can be realised depending on the subject combustion engine characteristics, such that in any case an optimum adaptation can be realised.

In all described systems also a valve controlled by the fuel control member can be provided in a second and third inlet conduit. By this the fuel supply to the engine can be closed ("Schubabschaltung") if the combustion engine is used in a motor vehicle and the motor vehicle is decelerated by said motor, at which the engine makes revolutions but does not supply any power. With all other systems working with underpressure (whether or not with another servosystem for generating underpressure) this is impossible.

Now the invention will be further explained with reference to several embodiments as example only and shown in the drawings.

FIG. 3 diagrammatically shows a further developed embodiment of the invention.

Figure 1:
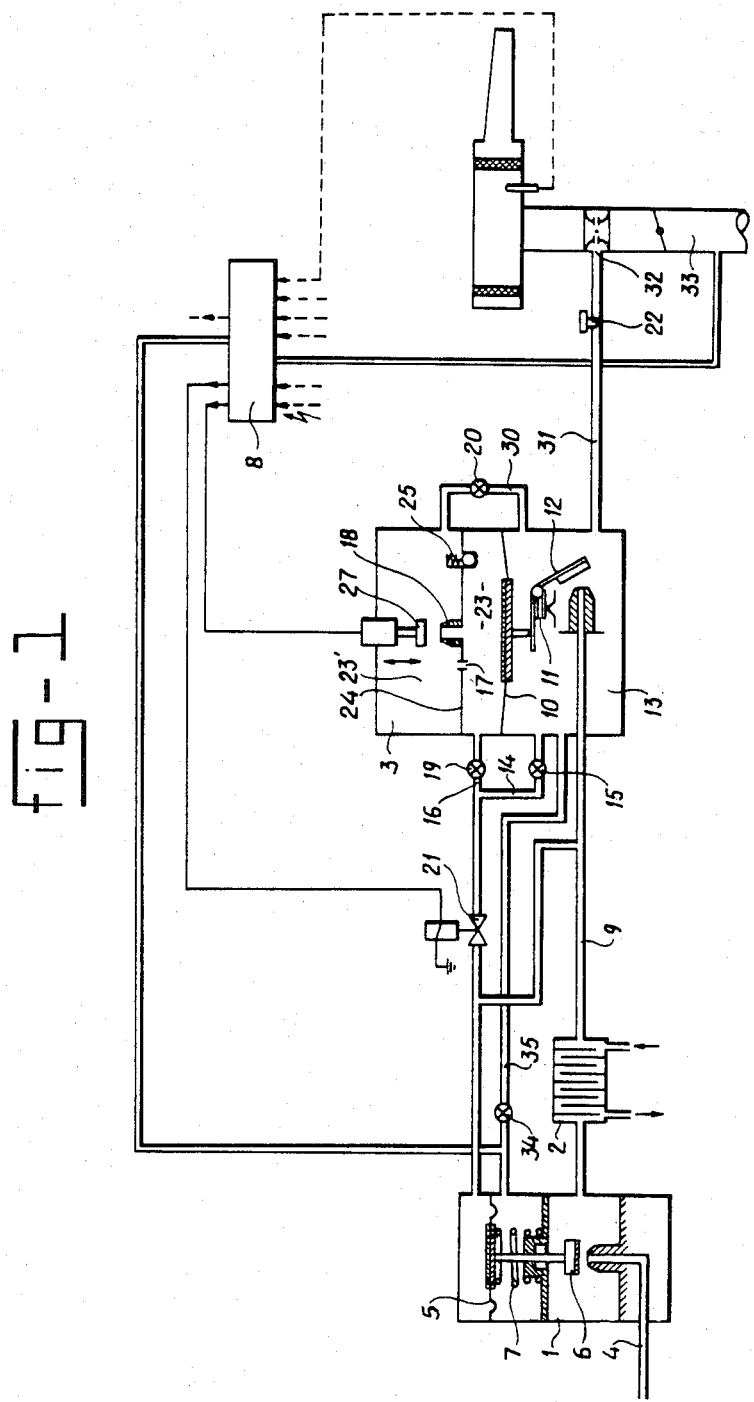
FIG. 1 is a diagrammatic representation of a pressure regulating system according to the invention in a first embodiment.

Referring to FIG. 1 an evaporating-pressure regulating system is shown, comprising a first reducing device 1 known per se, a heater/ evaporator 2 and a second reducing device 3. The liquid fuel supplied through the inlet conduit 4 to the first reducing device 1 and under variable pressure, is partly evaporated there and is supplied to the heater/evaporator 2 through a reducing device 1, comprising a valve 6 controlled by a diaphragm 5 and a spring 7, where the fuel evaporates completely and is heated. Thereupon the gas is supplied to the second reducing device 3. This is realised by a first inlet conduit 9, which is connected with a first chamber 13 of the second reducing device by a valve 12 controlled by a diaphragm 10 and a spring 11. Furthermore at the second reducing device 3 a second inlet conduit 14, opening in the first chamber 13 through an adjustable restriction 15 and a third inlet conduit 16, opening in a second chamber 23 through an adjustable restriction 19, are provided. These second and third inlet conduits 14 and 16 respectively are connected to the first inlet conduit 9 by a valve 21 controlled by a fuel control member 8. Said second chamber 23 is defined on the one hand by the rear side of the diaphragm 10 controlling valve 12 and on the other hand by a baffle 24 provided with a restriction with fixed surface area 17, a nozzle 18 and a safety valve 25. Above the baffle 24 a chamber 23' is provided, in which a valve 27, being controlled by the fuel control member 8, acts on the nozzle 18. Furthermore said chamber 23' is connected with the first chamber 13 by a conduit 30 comprising an adjustable restriction 20. The outlet conduit 31 of the first chamber 13 can be provided with an adjustable restriction 22 between the first chamber and the feed point of the user.

The device functions as follows: By the combustion engine an under pressure is created in the outlet 31 of the second reducing device 3 and so in the first chamber 13. By this, diaphragm 10 will open the valve 12 against the pressure of spring 11, by which the gas, being under constant pressure supplied from the first reducing device 1 and from the heater/evaporator 2 can flow into the first chamber 13 and into the inlet 33 of the combustion engine, as is known per se. At the same time independently of the underpressure in the first chamber 13 always a quantity of gas determined by the adjustable restriction 15 flows through the second inlet conduit 14 into the first chamber 13. This quantity functions as fuel for the idling of the combustion engine. Also permanently a constant quantity of gas, determined by the restrictin 19, flows through the third inlet conduit 16 into the second chamber 23 and to the first chamber through a fixed restriction 17, an adjustable restriction assembly 18, 27 and an adjustable restriction 20. Said quantity of gas is also used for preparing the idling mixture of the combustion engine, but can also provide a pressure amplifying system. To further open the valve at known second reducing devices, a considerable underpressure must be supplied to the diaphragm 10. According to the invention the discharge of gas from the second chamber 23 is regulated such that if more fuel is required, said discharge is decreased, by which the pressure in the second chamber 23 increases and the diaphragm 10 also thereby further opens valve 12. This load-depending regulation of the pressure in the second chamber 23 can be realised in several ways. In FIG. 1 it comprises a fixed restriction 17 and a variable restriction assembly 18, 27. By moving actuating valve 27 more to nozzle 18, the pressure in the second chamber 23 and so the force on the diaphragm 10 will increase and with it the free area of valve 12 will increase. The actuating valve 27 is controlled by a fuel control member 8. In this fuel control member 8 data relating to the number of revolutions, the load, the temperature, the position of the throttle valve in the inlet manifold, the amount of detrimental substances, oxygen in the exhaust gases, etc, are processed to an optimum position of the actuating valve 27. The device can also be combined with a device as described in the Dutch Patent Application 83,00441 and the fuel actuating member can give signals to a temperature control member described therein and not shown here. The fuel control member 8 is also connected to valve 21. By this the valve 21 can, if the combustion engine rotates faster than the idling speed but does not deliver any power, more or less be closed, by which the quantity of fuel required for idling is not supplied and the amplifying effect, as described above, is terminated, such that no or very little fuel is supplied to the engine.

The adjustable restriction 20 being provided in the conduit 30 between the first and second chamber, functions to trim the second reducing device 3 to the subject engine. The safety valve 25 is provided for blowing off the pressure through the conduit 30, if said pressure in the second chamber 23 increases too much. At the first chamber 13 of the second reducing stage 3 also a conduit 35 can be provided being connected with the first reducing device 1 through a restriction 34, by which the supply pressure of the gas to the second reducing device 3 can be influenced. By influencing the pressure in said conduit between the restriction 34 and the first reducing device 1 through fuel control member 8, the pressure of the gas supplied to the second reducing device 3 can be further controlled, in which the influence thereof on the pressure in the first chamber 13 of the second reducing device 3 is small because of the restriction 34 and the fuel member 8 is able to relatively simply overrule the pressure prevailing in the first chamber 13. With the device described here a stable pressure regulating system is provided being adapted to the whether or not linear characteristic of the combustion engine.

Figure 2:
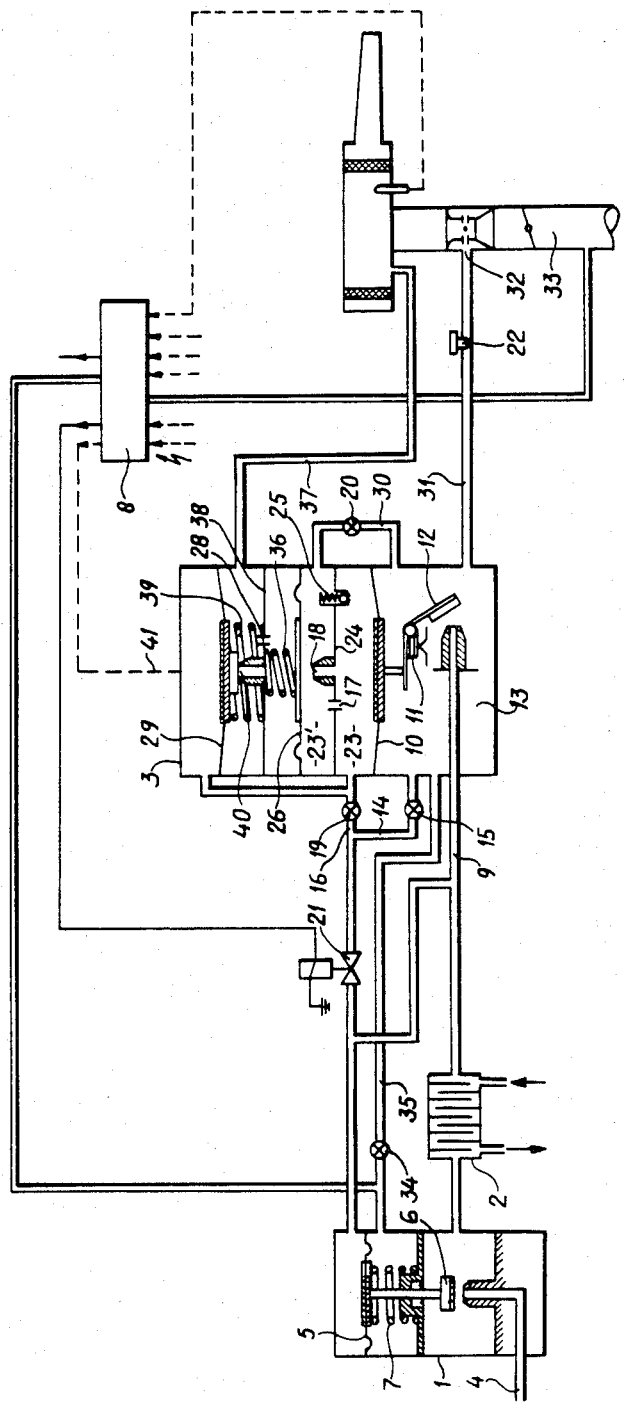
FIG. 2 shows diagrammatically a further embodiment according to the invention.

In FIG. 2 another preferred embodiment of the invention is shown, which only differs from the FIG. 1 embodiment by another load-dependent regulating of the pressure in the second chamber 23, which is obtained as follows.

Instead of being determined by the actuating valve 27, the free flow out area of nozzle 18 is determined by the position of a second diaphragm 26. This diaphragm 26 may or may not be influenced by a spring 36 at the other side, and is influenced by the pressure in a conduit 37, the reference pressure, through a damping device. The damping device comprises in the shown embodiment a baffle 38 being placed between the second diaphragm 26 and the conduit 37, and being provided with a fixed restriction 28 and a nozzle 40, of which the free flow out area is influenced by a third diaphragm 29 influenced by spring 39, said diaphragm 29 being influenced at the other side by the pressure in the second chamber 23.

If the spring 36 acting on the second diaphragm 26 is not available, the device works as follows:

The overpressure in the second chamber 23, determining the amplifying function of the device, is dependent on the position of the second diaphragm 26. Apart from the damping device the position of the diaphragm is determined by the interaction of the gas arriving from restriction 19 and the pressure in the conduit 37. As the first is constant, the pressure in conduit 37 ultimately determines the position of the diaphragm. By connecting the conduit 37 behind the air filter to the inlet manifold, the underpressure in the first chamber 13 will increase at a determined quantity suctioned air if the air filter clogs, but by the underpressure in the conduit 37 the amplifying function of the gas arriving from the third inlet conduit 19 decreases because the second diaphragm further opens the nozzle. By this, together with the size of the restriction 19 only the pressure difference between the conduit 37 and the outlet conduit 31 is of importance for the quantity of gas which is discharged. By this system it is possible to connect the conduit 37 and 31 under the throttle valve of the engine and to place said conduits at a supercharged engine behind the compressing device. This is so because at suitable adjustment of restriction 19 only the pressure difference between conduits 31 and 37 is of importance for the quantity of supplied fuel, and not the absolute pressure itself. Said damping device for conduit 37, comprising a diaphragm 29, the fixed restriction 28 and the spring 39, can be sized in different ways to be suitable for the amplifying characteristic of the device. Furthermore the diaphragm 29 can be controlled by the fuel control member 8 through a control conduit, dashed line 41.

If the spring 36 acting on the second diaphragm is provided, the system functions as follows:

If the spring 36, as shown, is placed above the second diaphragm 26, there is exerted, besides the reference pressure, being positive relative to the pressure in the outlet conduit 31, an additional force by spring 36 on the second diaphragm 26. So the equilibrium pressure in the chamber 13 can be chosen at a desired higher value. By this the venturi in the inlet of the combustion engine can be sized larger or even be completely omitted, because little or no signal is required anymore for controlling diaphragm 10. The flow of gas can be determined in the latter case by a known valve being controlled through another system and provided in conduit 31, at which the supply of gas can be realised behind the throttle member of the combustion engine. Also the spring 36, contrary to what is shown, can be placed below the second diaphragm 26. By this there will always be a constant pressure difference between the reference pressure and the pressure in the first chamber 13.

In FIG. 3 a further embodiment of the invention is shown, corresponding with the embodiment shown in FIG. 2 without spring 36, but at which the second diaphragm comprises two mutually connected first and second membrane parts 42 and 43 respectively. The diaphragm 43 has a larger surface area then diaphragm 42. Between these two diaphragm parts 42 and 43 a space is defined, which is divided in a chamber 46 faced to the third diaphragm 29 and a chmaber 47 faced to the first diaphragm 10 by a baffle 44. Said baffle 44 comprises additionally to an opening for connecting both diaphragm parts 42 and 43 and sealed relatively to the chambers 46 and 47, a restriction 45. The chamber 46 is on the one hand connected to the fuel control member by the conduit 51, whilst on the other hand being connected to the inlet delivery sensing point 49 in the inlet of the engine through a restriction 48 and the conduit 50. Because of the difference in surface area between the diaphragms 42 and 43 each pressure difference at both sides of the larger diaphragm 43 corresponds in the state of equilibrium with a larger pressure difference at both sides of the diaphragm 42. By this diaphragm system the pressure difference of the delivery sensing is amplified and inverted, by which the pressure in chamber 23′ increases at increasing air delivery. The places for sensing the delivery (here by pressure difference sensing between 37 and 49) and for the introduction of gas into the inlet manifold at 32 are separated. This allows to optimally size the venturi for the function of measuring the air consumption of the engine, at which no account has to be taken of the gas which also flows through, as happens at conventional devices. The same applies to the gas intake member in the inlet manifold 33 of the combustion engine. Because the absolute air pressure at the point of introduction of gas is of no importance anymore for the quantity of gas being supplied, the introduction point of the gas can be chosen to ly downstream of a compressor or below the throttle valve of a combustion engine if the inlet delivery sensing connections are positioned at the same side of the compressor, or throttle valve respectively.

For pre-adjusting of course spring forces can be exerted on the diaphragms. By providing the conduit 51 between the fuel control member 8 and the chamber 47, the pressure prevailing in said conduit 50 can be overruled by the fuel control member. By this the quantity of supplied gas can be made dependent of other, above mentioned, variables. By providing the restriction 48 short circuiting of the system is prevented.

We claim:

1. A pressure regulating amplifier system for an internal combustion engine or the like comprising a first and a second inlet conduit opening in a first chamber, through which gas is supplied under constant pressure, the first inlet conduit being separated from the first chamber by a valve connected with a diaphragm and the second inlet conduit comprising an adjustable restriction, through which a constant small quantity of gas is supplied to the first chamber, an outlet conduit directly connected to the first chamber and connected to the inlet of the internal combustion engine or the like, and a second chamber being separated from the first chamber by the diaphragm, a third inlet conduit connected to the second chamber, said third inlet conduit being provided with an adjustable restriction, through which a constant small quantity of gas is supplied to the second chamber and the second chamber is connected to the first chamber outlet conduit through a variable restriction.

2. A pressure regulating amplifier system according to claim 1, wherein said variable restriction is actuated by a fuel control member.

3. A pressure regulating amplifier system according to claim 1, wherein the variable restriction comprises a nozzle cooperating with a second diaphragm, at which the side of the second diaphragm faced away from the nozzle, is affected by a reference pressure.

4. A pressure regulating amplifier system according to any of the preceding claims, wherein a non adjustable restriction is provided in parallel with the variable restriction.

5. A pressure regulating amplifier system according to claim 3, wherein the reference pressure acts on the side of the second diaphragm faced away from the nozzle through a damping device.

6. A pressure regulating amplifier system according to claim 5, wherein the damping device comprises a fixed restriction and a variable restriction switched in parallel therewith.

7. A pressure regulating amplifier system according to claim 6, wherein the variable restriction comprises a nozzle actuated by a third diaphragm a spring force and the reference pressure acting on the one side faced to the nozzle and the pressure prevailing in the second chamber acting on the other side of the third diaphragm.

8. A pressure regulating amplifier system according to claim 5, 6 or 7, wherein the second diaphragm is influenced by spring force.

9. A pressure regulating amplifier system according to any of claims 5, 6 or 7, wherein the gas supply to the user and the inlet delivery sensing conduit are separated, in that the second diaphragm is split up into two diaphragms placed at a distance from each other and connected to each other, the space between said diaphragms being divided into a chamber faced to the first diaphragm and a chamber faced to the third diaphragm, by a baffle provided with a restriction and wherein the chamber faced to the third diaphragm is connected to the fuel control member and to the inlet delivery sensing conduit through an adjustable restriction.

10. A pressure regulating amplifier system according to claim 9, wherein a diaphragm controlling the nozzle has a smaller effective surface area than the other diaphragm forming the second diaphragm.

11. A pressure regulating system according to any of claims 1, 2, 3, 5, 6 or 7, wherein additionally an adjustable restriction is placed between the first and second chamber.

12. A pressure regulating system according to any of claims 1, 2, 3, 5, 6 or 7, wherein a valve controlled by the fuel control member is provided in the second and third inlet conduit.

13. A pressure regulating system according to claim 4 wherein the reference pressure acts on the side of the second diaphragm faced away from the nozzle through a damping device.

14. A pressure regulating amplifier system according to claim 8 wherein the gas supply to the user and the inlet delivery sensing conduit are separated, in that the second diaphragm is split up into two diaphragms placed at a distance from each other and connected to each other, the space between said diaphragms being divided into a chamber faced to the first diaphragm and a chamber faced to the third diaphragm, by a baffle provided with a restriction and wherein the chamber faced to the third diaphragm is connected to the fuel control member and to the inlet delivery sensing conduit through an adjustable restriction.

15. A pressure regulating amplifier system according to claim 4 wherein additionally an adjustable restriction is placed between the first and second chamber.

16. A pressure regulating amplifier system according to claim 8 wherein additionally an adjustable restriction is placed between the first and second chamber.

17. A pressure regulating amplifier system according to claim 14 wherein additionally an adjustable restriction is placed between the first and second chamber.

18. A pressure regulating amplifier system according to claim 4 wherein a valve controlled by the fuel control member is provided in the second and third inlet conduit.

19. A pressure regulator amplifier system according to claim 8 wherein a valve controlled by the fuel control member is provided in the second and third inlet conduit.

20. A pressure regulator amplifier system according to claim 14 wherein a valve controlled by the fuel control member is provided in the second and third inlet conduit.

21. A pressure regulating amplifier system according to claim 15 wherein a valve controlled by the fuel control member is provided in the second and third inlet conduit.

22. A pressure regulating amplifier system according to claim 16 wherein a valve controlled by the fuel control member is provided in the second and third inlet conduit.

23. A pressure regulating amplifier as claimed in claim 17 wherein a valve controlled by the fuel control member is provided in the second and third inlet conduit.

* * * * *